Feb. 13, 1940.   P. W. SMITH   2,190,505
AUTOMATIC TRAIN CONTROL SYSTEM FOR RAILROADS
Filed Nov. 19, 1938   7 Sheets-Sheet 1
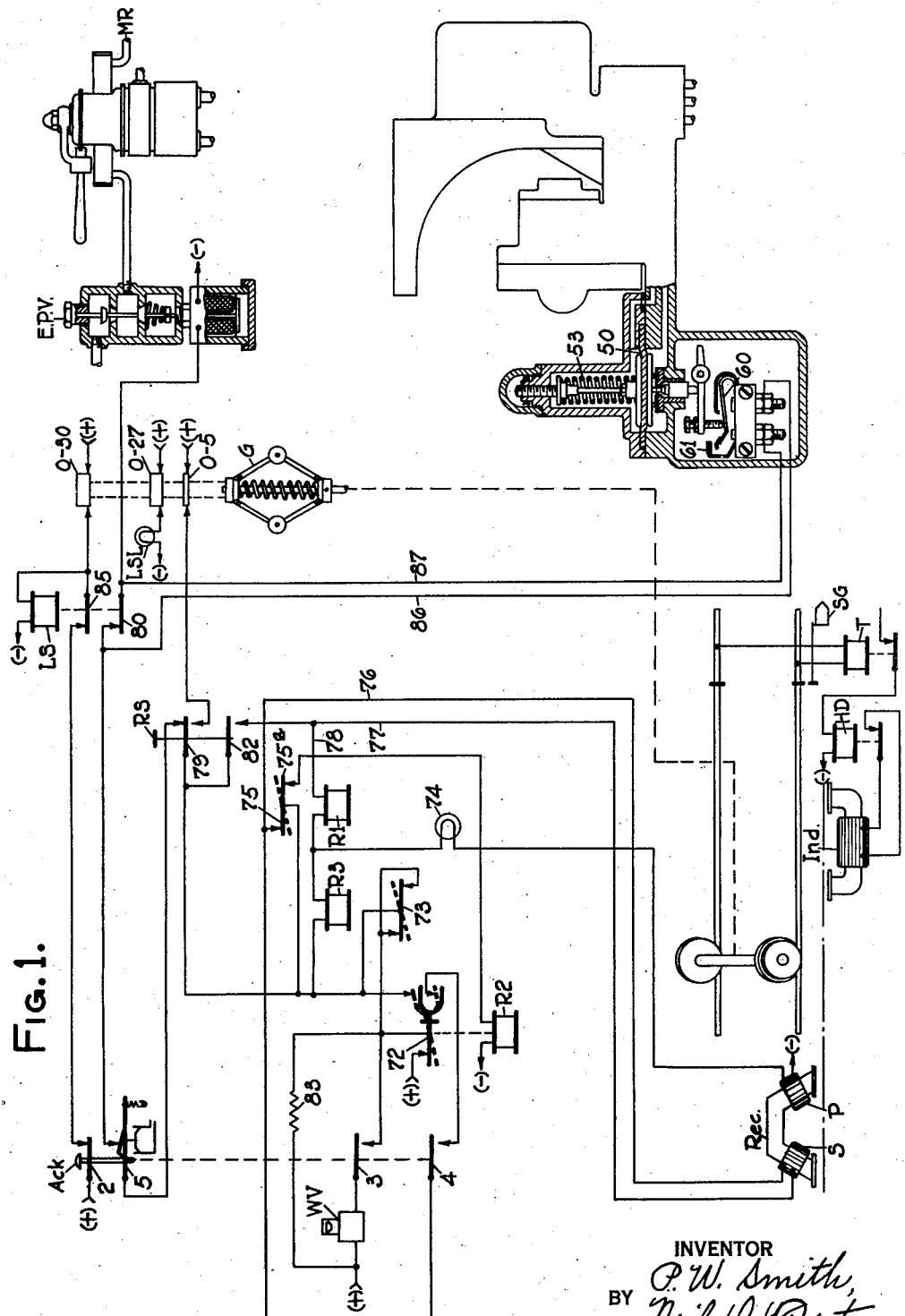
INVENTOR
P. W. Smith,
BY Neil D. Ralston,
his ATTORNEY Feb. 13, 1940.   P. W. SMITH   2,190,505
AUTOMATIC TRAIN CONTROL SYSTEM FOR RAILROADS
Filed Nov. 19, 1938   7 Sheets-Sheet 2
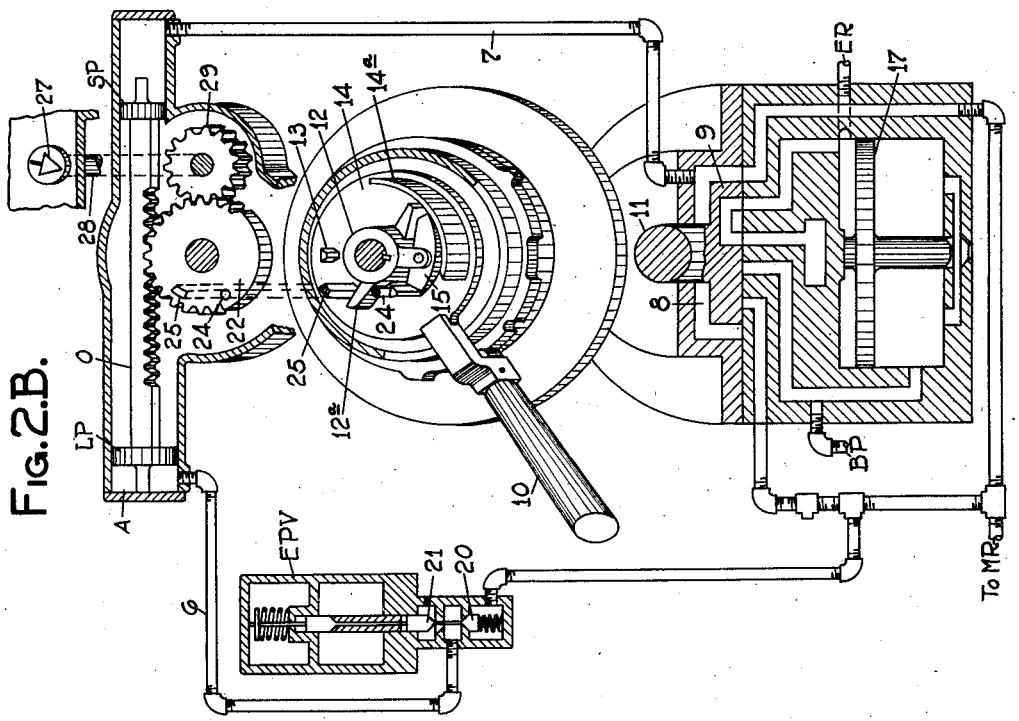
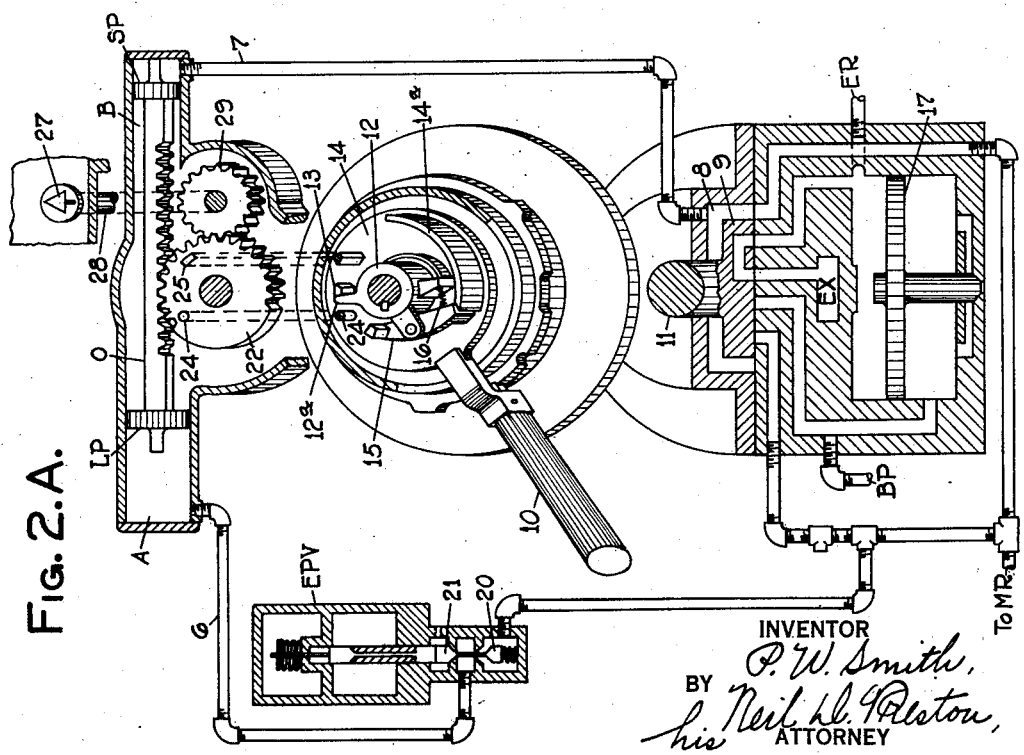
INVENTOR
P. W. Smith,
BY Neil W. Preston,
his ATTORNEY Feb. 13, 1940.  P. W. SMITH  2,190,505
AUTOMATIC TRAIN CONTROL SYSTEM FOR RAILROADS
Filed Nov. 19, 1938  7 Sheets-Sheet 5

INVENTOR
P. W. Smith,
BY Neil W. Reston,
his ATTORNEY

FIG. 6.

Feb. 13, 1940.  P. W. SMITH  2,190,505
AUTOMATIC TRAIN CONTROL SYSTEM FOR RAILROADS
Filed Nov. 19, 1938   7 Sheets-Sheet 7

INVENTOR
P. W. Smith,
BY Neil D. Preston,
his ATTORNEY

Patented Feb. 13, 1940

2,190,505

UNITED STATES PATENT OFFICE 2,190,505

AUTOMATIC TRAIN CONTROL SYSTEM FOR RAILROADS

Percy W. Smith, New York, N. Y., assignor to General Railway Signal Company, Rochester, N. Y.

Application November 19, 1938, Serial No. 241,397

24 Claims. (Cl. 246—63)

This invention relates to automatic train control systems for railroads, and more particularly to apparatus for enforcing certain prescribed speed restrictions upon the movement of a train in connection with an automatic stop system with the permissive or forestalling feature.

In the well known train control system of the so-called permissive automatic stop type, sometimes known as an Auto-manual system, the engineer is required to operate manually a forestalling or acknowledging device at each caution or stop signal in order to avoid an automatic application of the brakes which cannot be released until the train has been brought to a stop. A system of this type serves to enforce recognition and acknowledgment of the restrictive signal indications; but after the engineer has operated his acknowledgment device to show that he has recognized the caution or stop signal, the application of the brakes to slow down and stop the train properly is thereafter left to the judgment and discretion of the engineer. It has been demonstrated by years of practicable operation that such a permissive automatic stop system affords a high degree of safety in train operation; but there is the possibility that some engineer may at some critical time be careless or negligent, or err in judgment, in the proper control of the speed of his train, after acknowledgment of a restrictive signal indication, and fail to reduce the speed of his train at the proper time or to the proper degree, so that a collision may result.

With these considerations in mind, and with the object of increasing the safety afforded by such a permissive automatic stop system, without materially interfering with the expeditious movement of traffic, it is proposed in accordance with this invention to impose certain restrictions upon the speed at which an engineer may run his train after acknowledgment of a restrictive signal indication, so as to minimize the chances of a collision due to failure of the engineer to reduce speed properly in a caution block.

One feature of the invention is that the operation of the acknowledging contactor by the engineer in recognition of the caution signal automatically renders effective the speed limiting apparatus, which will act to automatically apply the brakes, if not already applied, and will prevent release of the brakes until the speed of the train has been reduced below some prescribed speed limit, such as 30 miles per hour. Such control of the speed limit apparatus by the manual actuation of the acknowledging device, rather than automatically by a control transmitted from the trackway, provides additional protection against the misuse of the acknowledging device, and also may be said to provide an additional safeguard against defective operation of the communication means transmitting controls from the trackway, inasmuch as the engineer himself imposes a speed restriction by the operation of the acknowledging contactor upon the approach to a caution signal, in order to avoid a penalty stop, thereby restricting train movement irrespective of the functioning of the communication means.

Another feature of the invention is that the automatic brake application which results from exceeding the prescribed speed limit may be made a limited reduction in brake pipe pressure, corresponding to a full service application, or such other degree of braking as may be desired, so that there is no unnecessary depletion of the brake pipe pressure, nor objectionable delay in the release of the brakes after the speed has been brought down to the prescribed limit. More specifically, it is contemplated that the brakes will be automatically applied by the operation of a brake valve actuator to move the regular engineer's brake valve of the air brake system to the service position, and that after the desired predetermined reduction in the equalizing reservoir pressure has been made, a contactor responsive to such predetermined reduction will be closed to restore the brake valve actuator to its normal inactive condition, thereby permitting the engineer to operate his brake valve to the lap position and avoid venting of the brake pipe below the pressure required to produce the desired degree of braking.

When a train enters a caution block at a normal running speed, the distance ordinarily required to bring the speed of such train below the restricted speed limit would not leave much distance in the block in which the train could accelerate after the restricted speed limit is removed; but if the train should enter the caution block at some medium or low speed, the restricted speed limit enforced by the deenergization of the low speed relay LS is effective, if at all, for a limited distance of travel of the train through the block, and leaves a considerable distance in which the train might accelerate to an objectionably high speed before reaching the next control point at the end of the block. In view of such a contingency, a further feature of the invention, which may be employed if desired, is that the restricted speed limit, rendered effective upon operation of the acknowledging device by the engineer, is automatically maintained in effect for a predetermined interval of time thereafter, such as two minutes, irrespective of the running speed of the train.

Other characteristic features, attributes, and advantages of the invention will appear in connection with the description of the specific embodiments of the invention illustrated.

This application is a continuation in part of my prior application, Ser. No. 14,852, filed April 5, 1935, for improvements in Automatic train control systems.

The accompanying drawings illustrate diagrammatically and conventionally certain forms of the invention, the parts and circuits being illustrated more with a view to facilitate an understanding of the nature of the invention, than to show the detail construction and arrangement of parts that would be preferably employed in practice. In describing the invention in detail, reference will be made to these drawings in which:

Fig. 1 illustrates in a simplified and diagrammatic manner one form of the car apparatus embodying the invention, together with a portion of the track equipment;

Figs. 2A and 2B are diagrammatic views of the brake valve actuator and engineer's brake valve in the normal running condition, and in the automatic service position, respectively;

Fig. 6 is a diagrammatic illustration of one embodiment of the invention including with the illustration of additional parts the same organization of circuits disclosed in my prior application, Ser. No. 14,852.

Figure 3:
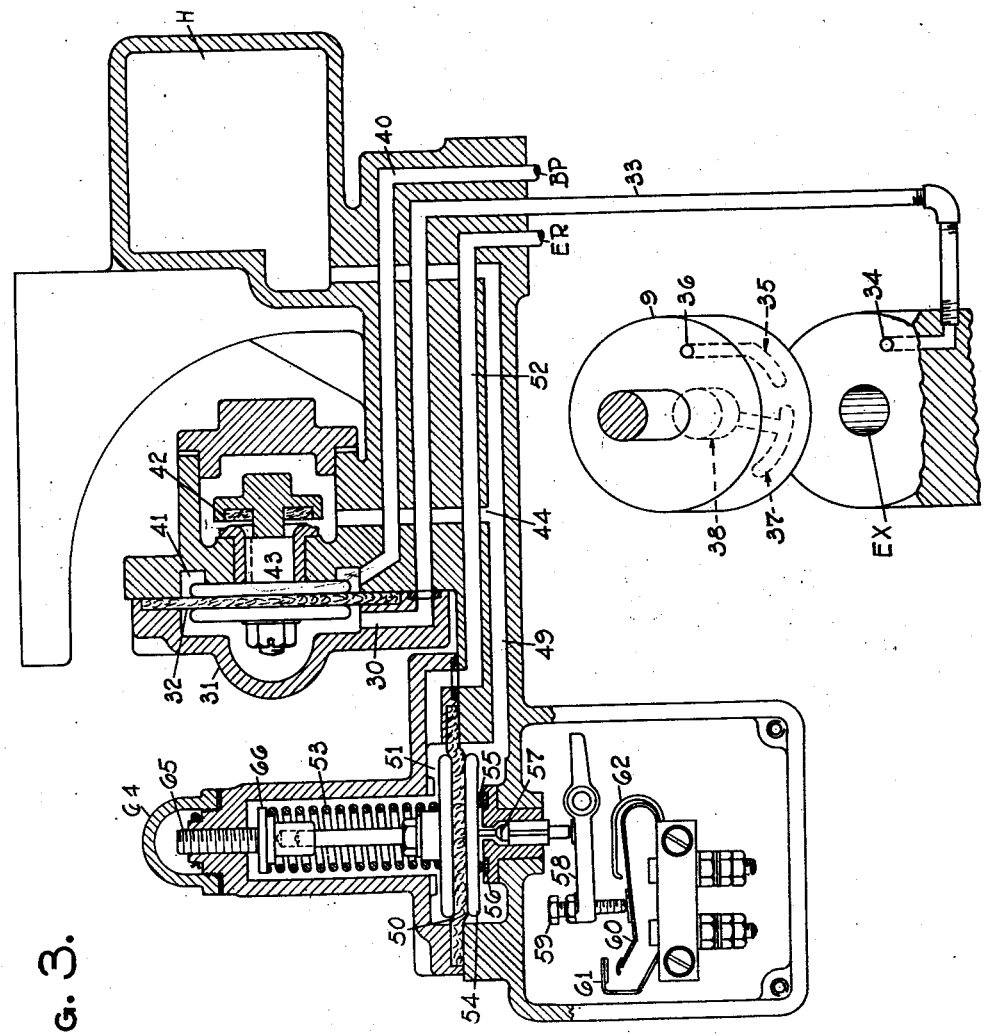
Fig. 3 is a sectional view of the reduction responsive contact and associated connections.

It is contemplated in accordance with this invention that the railroad will be equipped with any suitable or conventional type of automatic block signal system, including fixed wayside semaphore or color-light signals. Various forms of signals and organizations of control circuits, suitable for this purpose, are well known in the art, and need not be illustrated or described in detail.

To illustrate the relationship between the vehicle-carried apparatus of this invention and a suitable block signal system and associated track indicators, Fig. 1 shows a signal SG, a track relay T, and a line relay HD controlling the clear or stop condition of a track element or inductor IND, it being understood that this illustration is merely typical of the trackway equipment for the invention, which may be used in connection with any form of block signal system with multiple block indications, as well as the conventional indications of clear, caution, and stop.

*Apparatus for intermittent inductive control.*—
The system contemplated is of the intermittent control type, in which stopping impulses or influences are transmitted or communicated from the trackway to the moving locomotive or other vehicle near the entrance to each block in some suitable manner. As representative of such form of intermittent control, it is assumed that the means for communicating stopping impulses from the track to the moving vehicle will take the form of the type of intermittent inductive system, such as disclosed, for example, in the patents to W. K. Howe, No. 2,096,936, October 26, 1937; C. S. Bushnell, No. 1,686,434, October 2, 1928; and C. S. Bushnell, No. 1,767,578, June 24, 1930.

In this intermittent inductive system, a track inductor is located near the entrance to each block, preferably some 75 feet in the rear of the signal, and these track inductors cooperate inductively with a receiver REC on the vehicle to transmit through an intervening air gap a stopping impulse at caution and danger signals, but not at clear signals, by a momentary deenergization of a primary relay R1 on the vehicle. Briefly considering the structure and operation of this form of intermittent inductive control system, which is explained more in detail in the prior patents above mentioned, the track inductor IND comprises a laminated iron core of approximate U-shape, with a winding thereon included in a deenergized closed circuit of low resistance when the associated signal control relay HD is energized under clear conditions. The vehicle carried receiver REC comprises a similar laminated core, with a primary coil P and a secondary coil S thereon. The primary coil P is constantly energized by direct current and produces a strong magnetic flux through the secondary coil. When this receiver comes over a track inductor at a caution or stop signal, the winding of the inductor is open, and the reluctance of the magnetic circuit of the receiver is quickly and greatly decreased, thereby inducing a voltage in the secondary coil S to deenergize the primary relay R1, in a manner familiar to those skilled in the art. At a clear signal, the winding of the track inductor is on a closed circuit and acts like a choke coil to oppose the sudden increase in flux and prevent generation of sufficient voltage in the secondary coil S to deenergize effectively the primary relay R1.

*Vehicle equipment.*—In addition to the primary impulse receiving relay R1, the car or locomotive equipment comprises a repeater relay R2, and a brake control relay R3, with various interconnecting circuits later to be described.

The vehicle equipment also includes a suitable acknowledging device or contactor ACK, located in the locomotive cab within the convenient reach of the engineer. It is assumed that this contactor will be constructed as shown and described in the patent to Bushnell, No. 1,725,729, August 20, 1929. This acknowledging contactor ACK is illustrated conventionally and comprises certain normally closed contacts 2 opened upon manual actuation of the handle of the device, certain other normally open contacts 3 and 4 closed upon actuation of the handle, and a special time controlled contact 5 which, as explained more in detail in the patent to Bushnell, No. 1,725,729, and illustrated diagrammatically as including a dashpot or like timing device, is normally closed and opened if the handle is held in its operated position longer than a predetermined time interval such as 15 seconds.

The locomotive equipment also comprises a suitable resetting means, in the form of a manually operable reset contact RS or the like; a whistle valve WV of typical construction; an electro-pneumatic valve EPV of the usual type and construction; and a brake valve actuator, all of these devices forming part of a well-known type of Auto-manual of permissive automatic stop system.

To provide for enforcing a predetermined reduction in speed in accordance with this invention, the usual vehicle equipment of the Auto-manual system is supplemented by a low speed stick relay LS; a speed responsive device or governor G driven from the wheels of the vehicle; and a reduction responsive contactor or braking contact device, effective to close suitable contacts when the desired predetermined reduction has been made in the equalizing reservoir of the air brake system to correspond with the degree of braking desired.

The speed responsive device G, which may be of any suitable type, is illustrated as a centrifugal governor of the conventional form, assumed to be mounted on the axle of a vehicle, or otherwise operatively connected to an axle or wheel of the vehicle by suitable gearing or the like, as indicated conventionally by a dotted line. The purpose of this speed responsive device in accordance with this invention is to open certain contacts when the actual speed of the vehicle is above certain limits, the speeds at which these contacts are closed being designated 0—5, 0—30, etc.

*Brake valve actuator.*—The brake valve actuator is assumed to be of the same type illustrated and described in the Bushnell Patent No. 1,628,454, May 10, 1927, and is diagrammatically illustrated in Figs. 2A and 2B. Briefly considering the construction and operation of this brake valve actuator, and its relation to the usual air brake system, for the purposes of making clear the nature of the present invention, the parts are shown in the normal running positions in Fig. 2A. The electro-pneumatic valve EPV is energized and supplies pressure through a pipe 6 from the main reservoir MR to the large cylinder A against the large piston LP forcing the rack and piston unit O to the right-hand position illustrated against the main reservoir pressure supplied to the small cylinder B through the pipe 7 connected to the chamber 8 in the engineer's brake valve above the rotary valve 9. Under normal running conditions, the handle 10 of the engineer's brake valve is operatively connected to the stem 11 of the rotary valve 9 through the agency of a driver 12 fixed to said stem and a latch mechanism. A lug or projection 13 on the plate 14 integral with the handle 10 engages a projecting arm 12a of the driver 12, so that movement of the handle 10 from left to right carries with it the driver 12 and the rotary valve stem 11. A dog 15 pivoted to the driver 12, and urged to the position shown by a spring 16, engages a shoulder of a curved projection 14a on the handle plate 14, so that movement of the handle from right to left carries with it the rotary valve stem. Thus, with the brake valve actuator in the normal condition, the engineer's brake valve may be freely operated by the engineer to any position to control the brakes of the train. The brakes are manually applied in the usual way by moving the rotary valve to the service position to exhaust pressure from the equalizing reservoir ER and allow the equlizing discharge piston 17 to lift and vent the brake pipe BP.

Fig. 2B illustrates the parts in the automatic brake applying position. When the electro-pneumatic valve EPV is deenergized, one valve 20 closes to cut off the main reservoir connection 6 and another valve 21 opens to exhaust to atmosphere the pressure in the large cylinder A, thereby allowing the pressure constantly acting on the small piston SP to drive the rack and piston unit O to the left to rotate a segmental gear pinion 22 to cause an automatic service application of the brakes. During the first part of the movement of the pinion 22, a downwardly projecting pin 24 thereon engages the tail of the dog 15 and disengages it from the shoulder of the projection 14a of the handle plate 14; and another lug 25 downwardly projecting from the pinion 22 engages the arm 12a of the driver 12 and rotates it and the rotary valve stem 11 to the service position.

In other words, upon an automatic operation of the brake valve actuator, the regular operating handle 10 of the engineer's brake valve is unlatched or disconnected from the rotary valve 9, and this rotary valve is automatically moved to the service position to give an application of the brakes at the service rate the same as in manual braking. The handle 10 is disengaged from the rotary valve with respect to movements toward the left, that is, toward the release position, thereby preventing the engineer from opposing or cancelling the automatic brake application; but the engineer may, if necessary or desirable, move his handle to the emergency position, carrying with it the rotary valve, on account of the engagement of the lug 13 on the handle plate 14 with the arm 12a of the driver 12.

A movable pointer or indicator 27, outside of the casing of the actuator, is carried by a shaft 28 driven by a small gear 29 meshing with the pinion 22, as more clearly shown in the Bushnell Patent No. 1,628,454 above mentioned. This indicator 27 is automatically moved to different positions to show whether the actuator is in its normal position or in an operated position, thereby enabling the engineer to tell when he is able to latch up the handle and move the rotary valve to the lap or release position.

*Reduction responsive device.*—In the ordinary air brake system, for reasons familiar to those skilled in the art, after a certain reduction has been made in the brake pipe pressure, some 20 pounds or more depending upon the specific type of equipment, a full service brake application has been attained, i. e. the auxiliary reservoir and brake cylinder pressures have equalized; and further reduction of brake pipe pressure does not increase the braking effect. If the reduction in brake pipe pressure is carried beyond the point for a full service application, the subsequent recharge and release of the brakes is delayed by the time taken to replace the wasted air presure in the brake pipe; and with some types of equipment for passenger service, a reduction in brake pipe pressure beyond a certain point produces an emergency application.

In the system of this invention, automatic operations of the brake valve actuator and automatic brake applications may occur if the engineer fails to acknowledge the signals properly, or if the running speed of the train is above a prescribed speed limit upon entering a caution block. Since the brake application for failure to acknowledge occurs only under exceptional circumstances, excessive venting of the brake pipe in connection with the penalty stop for failure to acknowledge, is not particularly objectionable. On the other hand, an operation of the brake valve actuator in connection with enforcing a predetermined speed reduction in a caution block will occur frequently in regular train operation; and in this case it is desirable to avoid an unnecessary over reduction in brake pipe pressure, particularly since this would delay the recharge of the brake pipe and release of the brakes and bring the train down to a speed lower than necessary in cases of prolonged operation of the brake valve actuator.

Accordingly, it is proposed to provide a contacting device, responsive to the degree of reduction of the equalizing reservoir pressure, which will permit the engineer to move his brake valve to the lap position and arrest venting of the brake pipe pressure after the desired reduction has been made, but which at the same time will serve to prevent the engineer from releasing the brakes until the speed of his train has been brought down to the desired restricted speed limit.

One form of the reduction responsive contactor, suitable for this purpose, is illustrated in Fig. 3, the functions and mode of operation of this device being similar to that disclosed in the patent to Bushnell, No. 1,794,582, of March 3, 1931. This device comprises an organization of diaphragms, springs, valves, and passages which can be readily understood from the drawings from a description of the operation, without detail explanation of the arrangement and structure of the various parts.

Referring to Fig. 3, the various parts of the reduction responsive contactor are shown in the normal running condition. Passage 30, leading to a chamber 31 at the left of the diaphragm 32, is connected to a governor pipe 33 of the standard engine tender or ET air brake equipment. This pipe 33 in the standard equipment controls the pump governor, and is connected, as indicated diagrammatically in Fig. 3, to a hole 34 in the valve seat of the engineer's brake valve which registers with a cavity 35 in the under face of the rotary valve 9, this cavity 35 being connected by a port 36 through the rotary valve to the main reservoir pressure on top of it. With the rotary valve 9 in the release running or holding position, main reservoir pressure is thus supplied to the pipe 33; and when the rotary valve is moved to the service or lap position, this pipe 33 is blanked for the purpose of controlling the pump governor and build up excess reservoir pressure for recharging of the brake pipe. In order that any pressure in this pipe 33 and the chamber 31 may be quickly released when the rotary valve is moved to the service position, an additional cavity 37, connected to the center exhaust opening 38, is preferably provided for the purposes of this invention in the under face of the rotary valve to register with the port 34, to which the pipe 33 is connected, when a rotary valve is moved to the service or lap position.

Another passage 40, leading to chamber in the right-hand side of the diaphragm 32, is connected to the usual brake pipe BP of the air brake system. Under normal conditions, since the main reservoir pressure in the chamber 31 on the left of the diaphragm 32 is higher than the brake pipe pressure in the chamber 41 on the right of this diaphragm, said diaphragm and the valve 42 connected thereto are moved to the right to the position shown. In this way, the gasketed valve 42 is raised off its seat and allows brake pipe pressure to pass through the groove 43 shown dotted in its stem through a passage 44 to a storage or volume reservoir H. The pressure in this storage reservoir H is supplied by a passage 49 to the underside of another diaphragm 50.

The chamber 51 above the upper face of this other diaphragm 50 is connected by a passage 52 to the equalizing reservoir ER. A compression spring 53 also presses down to this other diaphragm 50. The tension of the spring 53 may be adjusted by removing the screw cap 64, which has a gasketed airtight fit with the casing for the spring, and by turning the adjustable stop screw 65 for the spring retaining collar 66.

Under normal running conditions, the equalizing reservoir and the brake pipe pressure acting on opposite faces of the diaphragm 50 are the same, and this diaphragm is held down in the position shown by the spring 53. This forces down the stem of a small fluted valve 57, the lower end of which engages a pivoted arm 58 carrying an adjustable screw 59 pressing against and holding a spring contact finger 60 in its open position out of engagement with a fixed contact 61, a rigid retaining member 62 being provided for the contact finger 60. The contact finger 60 and stationary contact 61 are connected to binding posts of a terminal block in a conventional manner.

The lower face of the lower diaphragm clamping disc 54 is preferably formed with a circular rib 55 engaging small gasket ring 56 so as to make an airtight seal about the upper end of the stem of the small valve 57, the small chamber within the rib 56 being exhausted to atmosphere around the stem of said valve, and through the flutes or grooves in the guiding post of the valve, into the housing for the contacts 60—61, which is enclosed but not airtight.

Thus, under normal running conditions the large valve 42 is open to connect the storage reservoir H to the brake pipe BP; and the diaphragm 50 operating the contacts 60—61 is held in its lower position by the spring 53.

If now the engineer's brake valve is moved to the service position, either manually or automatically by the operation of the brake valve actuator, the main reservoir pressure in the pipe 33 is exhausted for reasons above explained, and the brake pipe pressure acting on the right-hand face of the diaphragm 32 quickly seats the large valve 42 to trap in the storage reservoir H the brake pipe pressure existing at the time. The engineer's brake valve in the service position vents the equalizing reservoir ER in the usual way; and when this equalizing reservoir pressure has dropped a predetermined amount for which the spring 53 is adjusted, say 20 pounds, the trapped brake pipe pressure in the reservoir H becomes slightly greater than the reduced equalizing reservoir pressure plus the tension of the spring 53. As soon as this difference in pressures exists and the diaphragm 50 moves up sufficiently to break the seal of the rib 55 against the gasket 56, the area of the lower face of the diaphragm 50 exposed to pressure is increased, and this diaphragm moves quickly to its extreme upper position, closing the small valve 57 and allowing the contact finger 60 to be moved by its inherent tension into engagement with the stationary contact 61 to close a circuit.

Thus, when the equalizing reservoir pressure has been reduced from the value existing at the time the brake application was initiated to a predetermined extent, corresponding to the adjustment of the spring 53 and the desired degree of brake pipe reduction and effective braking desired, the contacts 60—61 are closed.

If, after such a predetermined reduction in equalizing reservoir pressure has been made, the engineer's brake valve should be moved to the release or other position tending to release the brakes, the main reservoir pressure is at once applied to the pipe 33 leading to the chamber 31 at the left of the diaphragm 32, thereby opening the large valve 42 to connect the storage reservoir H to the brake pipe BP and cause the pressure therein and acting on the under face of the diaphragm 50 to drop and render the spring 53 effective to move the diaphragm 50 down and open the contacts 60—61. In other words, when the engineer's brake valve is moved to release the brakes, the contacts 60—61 are at once opened.

*Operation of the system.*—One operating feature of the system of this invention is that an automatic application of the brakes, which cannot be released until the train has been brought to a stop, occurs whenever the engineer fails to acknowledge a caution or stop signal properly. The apparatus and circuits for performing this function operate in the manner characteristic of the so-called Auto-manual system and are explained more in detail in the prior patents to C. S. Bushnell, No. 1,686,434, October 2, 1928; No. 1,767,578, June 24, 1930; and No. 1,824,118, September 22, 1931.

This operation is conveniently reviewed briefly, before considering the operation of providing a restricted speed limit in connection with the operation of the acknowledging device and in accordance with the principles and mode of operation of this invention.

Fig. 1 illustrates the relays and circuits of the Auto-manual system in the normal running condition, the symbols (+) and (—) being employed to indicate connections to the opposite terminals of a turbo-generator or other suitable source of current on the locomotive.

The relay R3 is normally energized in series with the primary coil P by a circuit which may be traced from (+), through a front contact 72 of relay R2, front contacts 73 in multiple of relay R3, winding of relay R3, a ballast lamp 74, through the primary coil P, to (—).

The drop in potential across the winding of relay R3 provides an energizing potential for the normally closed stick circuit of the primary or impulse responsive relay R1 in series with the secondary coil S. The circuit in which current flows due to this drop of potential may be traced from left-hand side of relay R3, through front contact 75 of relay R1, wire 76, to secondary coil S, wires 77, 78 through the winding of relay R1, to the other side of the relay R3.

The repeater relay R2 is normally energized by a circuit which may be traced from (+), through front contact 72 of relay R2, front contacts 73 of relay R3, front contact 75a of relay R1, through winding of relay R2, to (—).

A circuit for normally energizing the electro-pneumatic valve EPV may be traced from (+), through front contact 72 of relay R2, front contacts 73 of relay R3, normally closed contact 79 of the reset switch RS, time controlled contact 5 of the acknowledging contactor ACK, front contact 80 of a low speed relay LS, through the winding of the electro-pneumatic valve EPV, to (—).

Thus, under normal running conditions, the relays R1, R2 and R3 are all energized; and the electro-pneumatic valve EPV is also energized keeping the brake valve actuator in its normal running condition. The engineer may apply and release the brakes as he may desire and run the train at any speed. Upon passing the track inductor at a clear signal, the primary relay R1 is not effectively deenergized and no operation of the car equipment occurs.

*Penalty stop.*—Assuming now that the train passes a track inductor in its active stopping condition at a caution or stop signal, and further assume that the engineer for some reason fails to actuate the acknowledging contactor ACK in recognition of such restrictive signal indication. The inductive impulse in the secondary coil S deenergizes the primary relay R1, which opens its own stick circuit at its front contact 75, and opens its front contact 75a to deenergize relay R2, which in turn opens at its front contact 72 the energizing circuits for the relay R3 and the electro-pneumatic valve EPV. Consequently, the brake valve actuator is operated and causes an automatic service application of the brakes, which the engineer cannot oppose or cancel. This brake application cannot be released until the relays are restored to their normally energized condition, and the electro-pneumatic valve EPV is energized to restore the brake valve actuator, to allow the engineer to latch his handle to the rotary valve and shift it to the release position. In short, an automatic application of the brakes occurs, which cannot be released until the train is brought to a stop and the apparatus reset. This constitutes a penalty stop for failure to acknowledge the signal.

The resetting of the relays and the electro-pneumatic valve EPV is intended to be accomplished manually, after the train has been brought to a stop. This may be accomplished by locating the reset contactor RS in such a position that it is accessible only from the ground, so that a train must be brought to a stop and the engineer or fireman get down on the ground to operate the reset device. This is the usual practice in the Auto-manual system; but when the locomotive is provided with a speed-responsive device G in accordance with this invention, it is proposed to obviate the necessity of some one getting down on the track to operate the reset device (which may be hazardous on trestles and under certain other conditions) by employing a contact of the speed-responsive device, closed only at very low speeds, say zero to 5 miles per hour, when the train is substantially at stop, in connection with a reset device located on the locomotive in any convenient position.

In the arrangement shown in Fig. 1, when the reset contactor RS is manually operated and the train has been brought substantially to a stop so that the contacts 0—5 of the speed responsive device G are closed, a circuit is established for energizing the relay R3, which may be traced from (+), through the contacts 0—5 of the speed-responsive device G, contact 79 of the reset contactor RS closed when this contactor is operated, through the relay R3, ballast lamp 74, and primary coil P, to (—).

This energization of the relay R3 creates a drop of potential across its windings to cause current to flow through the relay R1 over a path which may be traced from the left-hand side of the relay R3, through the contact 82 of the reset contactor RS now closed, through winding of relay R1 to the other side of relay R3. This energizes the relay R1 to close its contact and connect the secondary coil S with its winding; but at this time a short circuit for a secondary coil S is preferably provided through the contact 82 of the reset contactor, in order that any voltage that may be induced in the secondary coil S by the rising flux in the primary coil P is not effective upon the winding of the relay R1 to cause a release or flutter of its armature. This energization of relay R1 picks up relay R2, thereby closing a stick circuit to hold up relay R3 and permit the reset contactor RS to be released, leaving the relay R1 connected to the secondary coil S and in condition ready to respond to another impulse from the trackway. When the reset contactor RS is restored to close its contact 79, the circuit for energizing the electro-pneumatic valve EPV is closed, thereby completing the resetting of the apparatus.

Since the electro-pneumatic valve EPV is deenergized with the reset contactor RS in its operated position, said contactor cannot be maliciously held fastened down. Since the reset contactor RS is not effective unless the speed contacts 0—5 are also closed, the resetting of the apparatus cannot be accomplished until the train has been brought substantially to a stop, and the reset contactor may be located in the cab or any other convenient place on the locomotive. A manual operation of the reset contactor, in addition to the contacts of the speed governor manifesting that the train has been brought to a substantial stop, is preferably employed as shown, in order to require the co-operation and responsibility of the engineer or firearm in the restoration of the equipment after a penalty stop.

*Forestalling a penalty stop.*—Assume now that the engineer, upon approaching and observing a caution or stop signal, properly actuates the acknowledging contactor prior to passing over the track inductor. Under these conditions, when the relay R1 and its repeater R2 are deenergized by the impulse, a circuit for maintaining the relay R3 energized is established through the whistle valve WV from (+), through the winding of said valve, contact 3 of the acknowledging contactor ACK assumed to be closed, and thence through the contacts 73 of the relay R3 and its winding the same as in the normally energized circuit.

When the relay R2 is deenergized and moves its armature and contact fingers to the position indicated by dotted lines, and with the acknowledging contactor ACK in its operated position to close its contact 4, a shunt is established around the front stick contact 75 of relay R1, so that this relay is reenergized and in turn reenergizes relay R2. The closing of the front contact 72 of relay R2 establishes a low resistance shunt around the winding of the whistle valve, which stops sounding to advise the engineer that the acknowledging contactor may be released. The resistance 83 is preferably provided to protect the contact 72 of relay R2 against arcing.

In this way, an automatic brake application and a penalty stop may be forestalled by timely operation of the acknowledging contactor.

The time controlled contact 5 of the acknowledging contactor ACK, which is included in the energizing circuit for the electro-pneumatic valve EPV, is automatically opened and causes a brake application, if the acknowledging contactor is held in its operated position longer than a prescribed time interval, such as 15 seconds. Consequently, the acknowledging contactor ACK cannot be fastened or held down in its operated position and defeat the purpose of the system in requiring a manual act on the part of the engineer at each restrictive signal. In other words, the acknowledging contactor is effective for a limited time only for each operation; and while this time is sufficient to give the engineer reasonable latitude in the operation of the acknowledging contactor upon approaching and passing the track inductor at a restrictive signal, such time interval prevents the engineer from fastening down the acknowledging device, or acknowledging two successive signal indications by one manual operation.

Although, as presently to be described, each manual operation of the acknowledging contactor renders a restricted speed limit effective and by so doing protects the acknowledging device against misuse to a degree, the time controlled contacts are also preferably employed, in order to avoid the contingency that the engineer may pass a second restrictive signal indication without acknowledgment.

*Enforced speed restriction.*—In addition to the penalty stop for failure to acknowledge a restrictive signal indication, the system of this invention also acts, whenever the acknowledging contactor is operated, to establish automatically a restricted speed limit, so as to compel a reduction in speed in a caution block. The primary purpose of this enforced speed restriction may be said to avoid the contingency that an engineer, upon approaching a caution signal at high speed and properly acknowledging the signal, may for some reason fail to reduce the speed properly, and thus perhaps be unable to bring his train to a stop before running by the stop signal ahead and colliding with a train standing a short distance ahead of that signal.

Referring to Fig. 1 and considering the operation of establishing this restricted speed limit, the low speed relay LS is normally energized by a stick circuit which may be traced from (+), normally closed contact 2 of the acknowledging contactor, front contact 85 of the relay LS, winding of said relay, to (—). The relay LS may also be energized by a pick-up circuit from (+), through the speed contacts 0—30 of the speed-responsive device G, relay LS, to (—), so that if the train is travelling at any speed below the prescribed speed limit of 30 miles per hour, the relay LS is energized. A contact 80 of this low speed relay LS is included in the energizing circuit for the electro-pneumatic valve, shunted by wires 86, 87 and the contacts 60—61 of the reduction responsive contactor of Fig. 3.

When the engineer operates the acknowledging contactor ACK upon approaching a caution or stop signal for the purpose of avoiding the penalty stop above described, the stick circuit for the low speed relay LS is at the same time opened at the contact 2; and if the train speed is above the prescribed limit, so that the contacts 0—30 of the speed responsive device G are opened, the relay LS releases its armature and opens its contact 80 to deenergize the electro-pneumatic valve EPV and apply the brakes. After a predetermined reduction in equalizing reservoir pressure has been made as a result of such automatic operation of the engineer's brake valve, the reduction responsive contacts 60—61 are closed in the manner previously explained, thereby establishing a shunt around the contact 80 of the relay LS, so that the electro-pneumatic valve EPV is reenergized to restore the brake valve actuator to normal and enable the engineer to latch his handle to the rotary valve and return it to the lap position and arrest further venting of the equalizing reservoir and the brake pipe. The indicator 27 of the brake valve actuator enables the engineer to determine when he may lap his valve.

If the engineer should attempt to release the brakes while his train is running above the prescribed speed limit, the contacts 60—61 of the reduction responsive device at once open as above explained, the electro-pneumatic valve EPV is again deenergized, and the brake valve actuator operated to make a still further reduction in brake pipe pressure. The brakes cannot be effectively released until the speed of the train has been brought below the prescribed limit to close the speed contacts 0—30 and reenergize the low speed relay LS.

After the speed of the train has been reduced below the prescribed limit, and the relay LS reenergized, it is maintained energized by its stick circuit through the contact 2 of the acknowledging contactor. Under these conditions, the speed restriction is removed, the engineer may fully release the brakes, and proceed at any desired speed.

Figure 5:
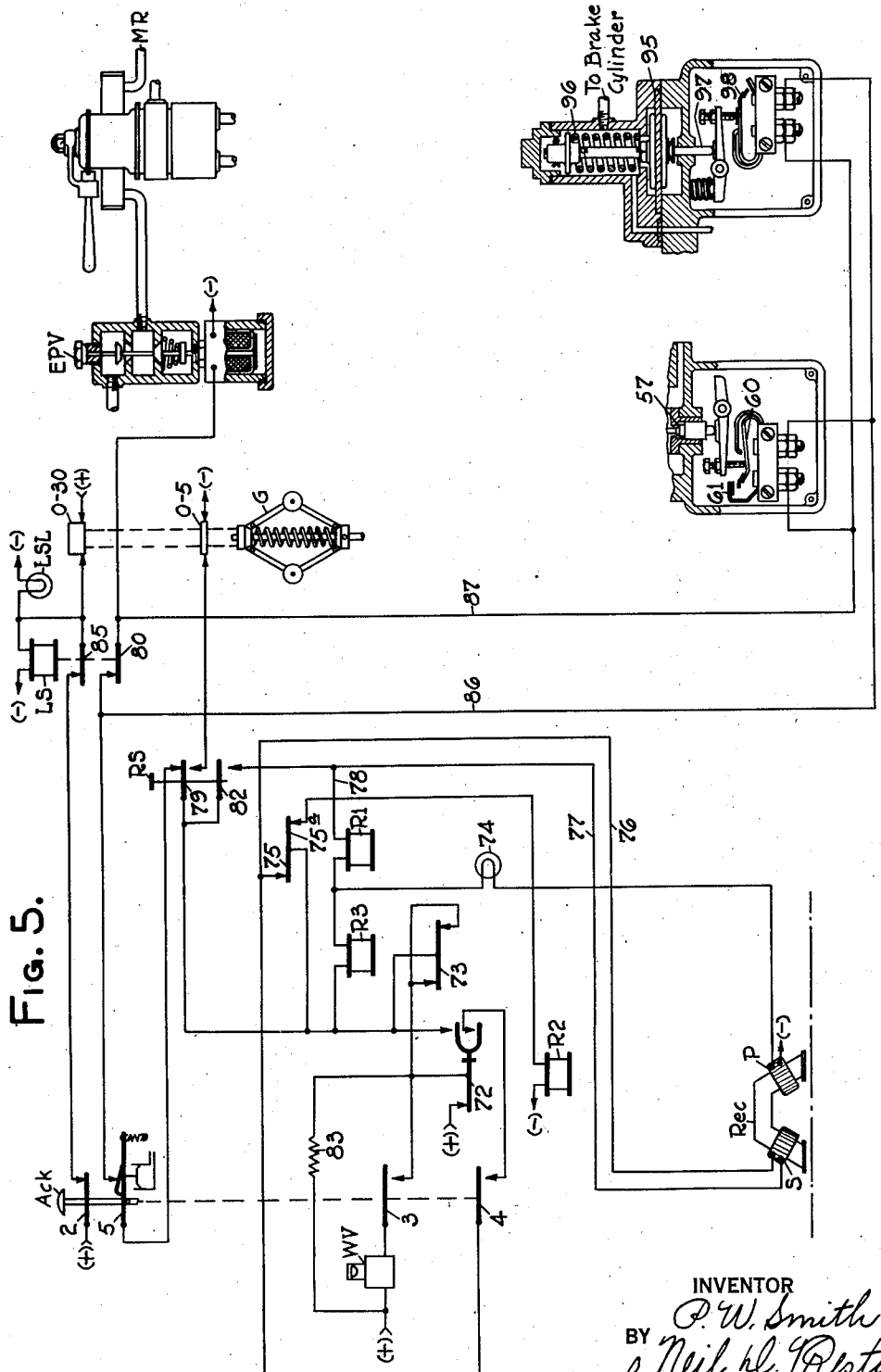
Fig. 5 illustrates a further modification of Fig. 1 designed primarily for freight locomotives.

An indicator lamp LSL controlled by speed contacts 0—27 is provided to enable the engineer to tell when the speed has been properly reduced and he may release the brakes. This indicator lamp LSL is extinguished for speeds above the prescribed limit, and is lighted for lower speeds. If desired, this indicator lamp LSL may be connected in multiple with the relay LS, as shown in the modification of Fig 5, or controlled by a contact of this relay, rather than by additional speed contacts 0—27, the primary function of this indicating lamp being to let the engineer know when the relay LS has been energized and he may release the brakes.

In case the engineer, upon observing the caution signal, should manualy apply the brakes with the prescribed reduction in equalizing reservoir pressure, prior to the operation of the acknowledging contactor ACK, and deenergization of the relay LS, the contacts 60—61 of the reduction responsive device are closed, and the electro-pneumatic valve EPV is not deenergized to cause operation of the brake valve actuator. This manual brake application, however, cannot be released effectively until the speed has been reduced to the prescribed limit and the relay LS restored.

From the foregoing explanation, it can be readily seen that a train passing a caution signal at its normal running speed will be slowed down by an application of the brakes, initiated either manually or automatically, until a control speed of say 30 miles per hour is reached, and the train may be stopped within a relatively short distance. This prevents an engineer, through a mistake in the judgment of his speed, or otherwise, running so fast through a caution block that he may not be able to stop at the next signal, or short of a train just beyond that signal. Also, it is considered that this enforced speed reduction in a caution block tends to discourage the objectionable practice of "running on caution signals." Except in special cases, such as at interlocking plants, where the train ahead causing the caution indication may get out of the way of the following train, the speed reduction enforced in accordance with this invention does not interfere with the traffic capacity of the railroad.

Another characteristic of this organization is that the engineer is not likely to misuse the acknowledging contactor and actuate it except at signals he actually sees in the caution or stop position, since a restricted speed limit is automatically rendered effective by each operation of the acknowledging device. This affords an additional protection against misuse of the acknowledging device, and avoids the possibility of "pumping" the acknowledging contactor to get by caution signals that may not actually be observed, due to fog, or other adverse weather conditions.

A further characteristic of this organization is that reduction in brake pipe pressure for an automatic brake application caused by excessive speed, is not automatically limited to a prescribed reduction, but only if the engineer takes advantage of the restoration of the brake valve actuator and manually latches up the handle of his brake valve and moves it to the lap position. In other words, the reduction is unlimited unless the engineer intervenes. It is considered that this arrangement is more likely to assure that an effective brake application will occur, than if the reduction were automatically limited by some means that might get out of order.

It can be seen that the engineer has adequate information to guide him in the manipulation of his train. He can tell from his observations of the wayside signals when it is necessary to operate the acknowledging contactor to avoid a penalty stop. The indicator 27 on the engineer's brake valve tells when he may lap the valve; and the indicating lamp LSL tells when he may release the brakes.

The system of this invention, although enforcing a restricted speed limit in a caution block, requires vigilance and action on the part of the engineer, so that he may not neglect his duty and place all of the responsibility for safe operation of the train wholly upon the automatic train control equipment. This is desirable, because the best constructed train control equipment may happen to develop a fault in its operation at some critical time.

Figure 4:
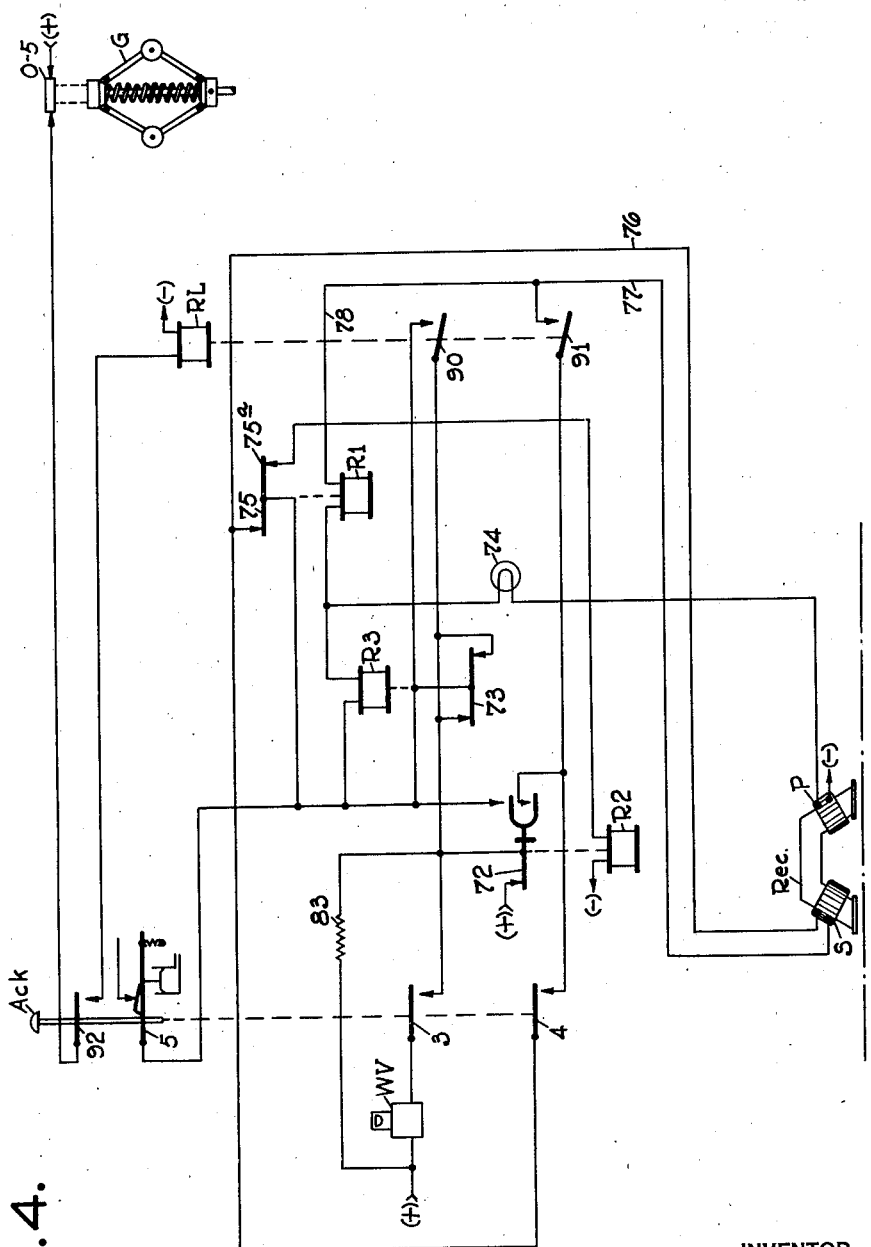
Fig. 4 is a diagrammatic illustration of a modified arrangement of Fig. 1 with respect to the resetting means.

*Modification for resetting.*—Fig. 4 illustrates a modification of the same equipment of Fig. 1, in which the reset after a penalty stop is accomplished by operation of the acknowledging contactor ACK in connection with the low speed contacts 0—5. This obviates the need for a separate reset contactor on the locomotive. In this modification, the resetting function is performed by a relay RL, the contacts 90 and 91, of which, when closed by the energization of this relay, act upon the relays and circuits to perform the same resetting function as the closure of the normally open contacts 79, 82 of the reset contactor RS of Fig. 1. This resetting relay RL is energized when the acknowledging contact ACK is operated to close a normally open contact 92 and the train at that time is substantially at rest with the speed contacts 0—5 closed, this energizing circuit being readily traced on the drawing.

*Modification for freight service.*—In the case of locomotives for freight trains, it is desirable to adjust the spring 53 of the reduction responsive device of Fig. 3, so that the contacts 60—61 close after a smaller reduction in equalizing reservoir pressure, say 8 or 10 pounds. Also, under some circumstances, particularly in the case of long feight trains, the running speed, slack conditions, or the like, may be such that it is desirable to avoid an application of the train brakes and obtain the desired speed reduction by an application of the engine brakes alone.

Fig. 5 illustrates a modification of the same equipment of Fig. 1, in which the contact 80 of the low speed relay LS is shunted by the contacts of an air switch device connected to a brake cylinder of the locomotive or tender, as well as by the contacts 60—61 of the reduction responsive device of Fig. 3. When the engine tender brakes are applied to a predetermined extent, as for example, when a brake cylinder of say 25 pounds exists, this pressure in the brake cylinder acting on the upper face of a diaphragm 95 overcomes the tension of a spring 96 to move a plunger 97 and close contacts 98. By reason of this arrangement, if conditions are unfavorable for full train braking at a caution signal, the engineer may avoid the operation of the brake valve actuator and such train braking by manually applying the engine brakes alone through the agency of the usual independent brake valve, to the prescribed degree to close the contacts 98, prior to the operation of the acknowledging contactor at the caution signal and the resultant deenergization of the relay LS. Also, even if the brake valve actuator has been operated and the train braking initiated, a prompt application of the engine brakes to close the contacts 98 and reenergize the electro-pneumatic valve to restore the brake valve actuator, gives the engineer control over his main brake valve to avoid further reduction in brake pipe pressure, or to release the train brakes, as conditions may require.

The automatic application of the brakes for freight trains involves a number of factors and problems; and the addition of the air-switch device as shown in Fig. 5 gives the engineer considerable latitude in the manipulation of the brakes to the best advantage, while requiring a certain degree of braking to slow down the train. In other words, the engineer is able to handle the brakes of a freight train in a manner consistent with good practice, to slow down the train, without an automatic application of the train brakes which might be optional under certain conditions.

Figure 6:
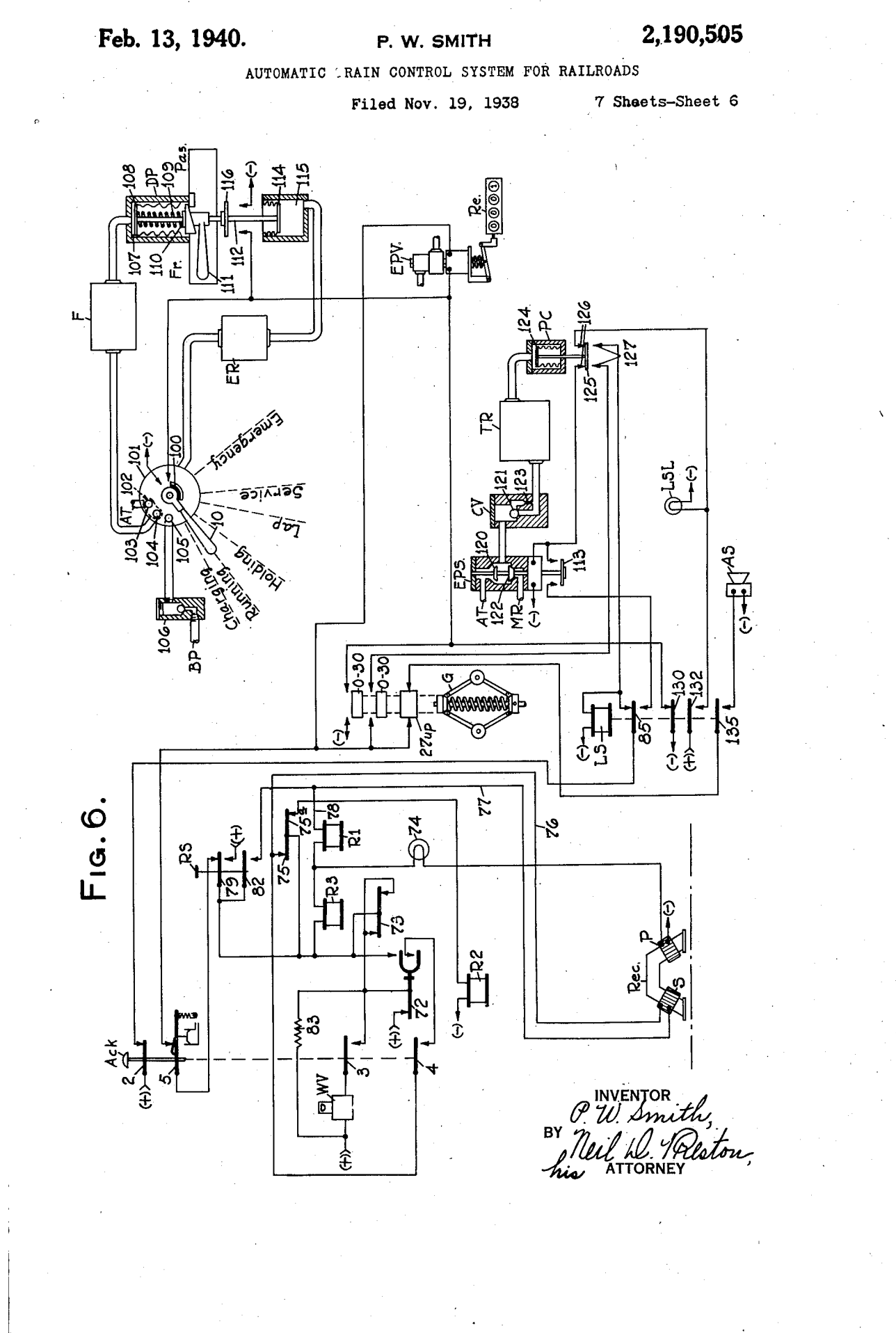

*Modification for enforcing restricted speed limit for a predetermined time.*—Fig. 6 illustrates another variation or modification of the invention, corresponding to the disclosure of my prior application, Ser. No. 14,852, filed April 5, 1935, of which this application is a continuation in part. In this modification, the prescribed restricted speed limit is maintained effective for a predetermined interval of time, irrespective of the fact that the running speed of the train may have been brought down below the restricted speed limit.

In this modification of Fig. 6, the handle 10 of the engineer's brake valve is arranged to close a contact when moved to the service or emergency position; and in the simplified arrangement diagrammatically illustrated, the handle 10 is provided with an insulated contact piece 100 adapted to engage and connect electrically stationary contacts, indicated as arrows, when this handle is in the service or the emergency position.

Fig. 6 also illustrates a modified form of a reduction responsive contact, which is adjustable by movement of a lever or handle to provide for different amounts of reduction in equalizing reservoir pressure when the same locomotive is used in freight and passenger service. A supplemental rotary valve 101, connected to the stem of the regular rotary valve in a manner illustrated, for example, in the patent to Bushnell No. 1,628,454, May 10, 1927, has a cavity 102 which cooperates with ports 103, 104 when the regular rotary valve is in the release, running or holding position, to connect a volume reservoir F to atmosphere.

When the regular rotary valve is moved to the service position, either manually or automatically, and also if moved to the emergency position manually, the cavity 102 cooperates with the ports 104, 105 to connect the volume reservoir F to the brake pipe BP through a ball check valve 106, which allows brake pipe pressure to flow to the volume reservoir F, but prevents the escape of pressure from the volume reservoir F to the brake pipe BP.

The pressure in the volume reservoir F is applied to a chamber 107 against a sylphon type diaphragm 108 of conventional construction which has its downward movement opposed by a spring 109. A member 110, against which the spring 109 bears at its lower end, is provided with a cam surface cooperating with a cam surface on the hub of a lever or handle 111, so that when this lever is moved from one position, marked "Fr." for freight service, to another position marked "Pas." for passenger service, the tension of the spring 109 is increased to correspond with a greater reduction desired for passenger service than for freight service, say from eight pounds to twenty pounds. This adjusting feature is provided only for locomotives designed for use in both passenger and freight service. In the case of the locomotive operating either in passenger service or freight service alone, the spring 109 may have a fixed adjustment corresponding with the class of service. The diaphragm 108 moves a rod 112, passing loosely through the handle 111, which bears against the head of another sylphon type diaphragm 114 in a chamber 115 connected to the equalizing reservoir ER. This rod 112 carries a contact member 116 adapted to engage stationary contacts indicated by arrows when the diaphragms and the rod move down to a predetermined extent.

With this modified construction of reduction responsive device, under normal running conditions the equalizing reservoir pressure on the lower diaphragm 114, together with the tension of the spring 109, hold the rod 112 to the upper position as shown to open the contacts 116, the volume reservoir F being at this time connected to the atmosphere through the ports 103, 104. When a rotary valve of the engineer's brake valve is moved to the service position, either manually or automatically by the operation of the brake valve actuator, the volume reservoir F is connected to the brake pipe and at once assumes the normal running brake pipe pressure then existing. As the pressure in the equalizing reservoir drops in the usual way to a predetermined extent corresponding with the adjusted tension of the spring 109, the trapped brake pipe pressure in the volume reservoir F becomes greater than the equalizing reservoir pressure plus the tension of the spring 109, and the rod 112 is moved down to close the contacts 116. If the brake valve under such conditions should be operated to the release position, the presure in the volume reservoir F is quickly exhausted to atmosphere, and the contacts 116 are at once opened by the spring 109 and the existing pressure in the equalizing reservoir acting against the diaphragm 114.

The modified form of the system illustrated in Fig. 6 also includes a suitable time measuring device, adapted to operate contacts after a predetermined time interval, such as two minutes. Any suitable electrically controlled or operated timing device may be employed for this purpose; but in the specific embodiment illustrated, a pneumatic timing device is shown. An electro-pneumatic control valve EPS of conventional construction, when in the normal deenergized position shown, opens a valve 120 to connect a timing reservoir TR to atmosphere through a ball check valve 121. When the electro-pneumatic valve EPS is energized, the exhaust to atmosphere is cut off by closing the valve 120, and another valve 122 is opened to supply main reservoir pressure to the timing reservoir TR through a restricted orifice 123 around the check valve 121. The pressure builds up slowly in the timing reservoir, depending upon the volume of this reservoir and the size of the restricted orifice; and the parts are so proportioned that the pressure developed after a short time interval will be sufficient to overcome the inherent spring tension of a sylphon diaphragm 124 of a pneumatic contactor PC and move an insulated contact member 125 connected thereto to open certain contacts 126, and after a longer time interval, such as two minutes, will move the contact member far enough to close other contacts 127.

Considering the operation of this modified arrangement, if the engineer fails to acknowledge properly a caution or stop signal, a penalty stop results in the same way already described. In this modification, a reset contact RS is used without any speed contacts, and hence is accessible only from the ground, so that it cannot be operated until the train has been brought to a stop.

If the engineer properly acknowledges the signal, the control relay R3 is maintained energized in a manner previously explained, but the low speed relay LS is deenergized, opening at its contact 130 a branch circuit for energization of the electro-pneumatic valve EPV governing the brake valve actuator. There are several contingencies to be considered with respect to the result of such deenergization of the relay LS.

If the speed of the train at the time of the acknowledgment is above the prescribed speed limit, the other branch circuit for energizing the electro-pneumatic valve EPV through the speed contact 0—30 is open, and the brakes are automatically applied by operation of the brake valve actuator, unless the engineer has anticipated such operation by moving his brake valve handle 10 to the service, or perhaps emergency position, to close the contacts 100. It is contemplated that the engineer, upon observing the caution signal, and running at a speed above the prescribed speed limit, will operate his brake valve handle to close the contacts 100 before operating the acknowledging contactor, with the resultant deenergization of the relay LS while passing over the track inductor, thereby preventing deenergization of the electro-pneumatic valve EPV and an automatic operation of the brake valve actuator.

If desired, the recorder Re illustrated diagrammatically and mechanically connected to the electro-pneumatic valve in some suitable manner, may be employed to record operations of the electro-pneumatic valve EPV due to failure of the engineer to properly acknowledge signals or forestall automatic operation of the brake valve actuator by manual movement of the brake valve handle. Such recorded operations of the electro-pneumatic valve, in connection with appropriate discipline, may be employed to impose a penalty upon the engineer for his failure to take the appropriate action at restrictive signal indications.

When a predetermined reduction in equalizing reservoir pressure has been made, either as a result of a manual or automatic brake application, the contacts 116 of the reduction responsive device close and establish another branch circuit for energization of the electro-pneumatic valve EPV. This permits the engineer to move his brake valve handle to the lap position without deenergization of the electro-pneumatic valve EPV, if the deenergization thereof was prevented by timely movement of the brake valve handle. Or, if the electro-pneumatic valve EPV had been deenergized and an automatic operation of the brake valve actuator had occurred, the closing of the contacts 116 of the reduction responsive device causes reenergization of the electro-pneumatic valve and restoration of the actuator, so that the engineer may latch up his handle with the rotary valve and restore it to the lap position in the same manner and for the same purpose as previously described in connection with the form of the system illustrated in Fig. 1.

The brake application brought into action, either by manual action of the engineer or an automatic operation of the brake valve actuator, results in reducing the running speed of the train; and when this speed is below the prescribed speed limit, the speed contacts 0—30 close, thereby establishing a branch circuit for the energization of the electro-pneumatic valve and permitting the engineer to release the brakes. If the engineer should move his brake valve handle out of the service position prior to the predetermined reduction, or should attempt to release the brakes with such predetermined reduction in effect, before the running speed of the train is below the prescribed speed limit, the brake valve actuator is automatically operated. In other words, the predetermined degree of braking, whether initiated manually or automatically, must be maintained in effect until the speed is brought below the prescribed limit, otherwise operation of the brake valve actuator occurs to cause another application of the brakes.

If the engineer, after the speed has been properly reduced and the brakes released, should attempt to increase the speed of the train above the prescribed limit while the low speed relay LS is still deenergized, the speed contacts 0—30 open and cause deenergization of the electro-pneumatic valve EPV and another brake application which cannot be released until the speed is again below the prescribed limit.

In other words, the prescribed speed limit is maintained effective until the low speed relay is again energized; and in the modification of Fig. 6, this relay LS is not energized until the running speed of the train is below the prescribed speed limit and also a predetermined time interval of say two minutes has elapsed, since the initial deenergization of the relay LS by operation of the acknowledging contactor.

When the relay LS is initially deenergized, its back contact 132 closes a circuit readily traced on the drawings through the contacts 126 of the pneumatic contactor PC to energize the winding of the control valve EPS, thereby initiating the operation of the time measuring device. The control valve EPS, thus energized, is maintained energized by a stick circuit from (+), through the contact 2 of the acknowledging contactor, back contact 85 of the relay LS, and contacts 113 of the valve EPS through its winding, to (−). This stick circuit maintains the valve EPS energized in spite of the opening of contacts 126 of the pneumatic contactor PC which are intended to open relatively quickly. In this way, the timing device is set into operation upon the initial deenergization of the low speed relay LS; and after the prescribed time interval, such as two minutes, has elapsed, the contacts 127 of the pressure contactor PC are closed. If at this time the running speed of the train is below the prescribed speed limit, so that contacts 0—30 of the speed governor G are also closed, a pick-up circuit to reenergize the low speed relay LS is established from (+), through front contact 72 of relay R2, front contact 73 of relay R3, normally closed contact 79 of the reset switch RS, through the time controlled contact 5 of the acknowledging contactor ACK, speed contacts 0—30, contacts 127 of the pressure contactor PC now closed by the elapse of the prescribed time interval, through winding of relay LS, to (—).

The reenergization of the relay LS under these conditions closes its contact 130 to maintain the electro-pneumatic valve EPV energized independently of the speed of the train or braking conditions. The opening of the contacts 85 and 132 of the relay LS deenergizes the valve EPS to restore the timing device to normal by quickly exhausting the timing reservoir TR. Thus, the parts are restored to normal conditions.

To guide the engineer in handling his train, an audible signal AS, in the form of an electrically operated horn or bell is preferably provided and sounded when its energizing circuit is closed by the back contact 135 of the low speed relay LS and speed contacts 0—27 arranged to be closed for speeds above 27 miles per hour or the like, corresponding to a speed slightly below the prescribed speed limit. The sounding of this audible signal AS tells the engineer that he is running at a speed above a restricted speed limit and may not release the brakes. When this signal AS stops sounding, the engineer knows that he may release the brakes. If, while the restricted speed limit is in force, the running speed should approach this limit at which another brake application might occur, the audible signal AS is again sounded to warn the engineer, the contacts 0—27 controlling the signal AS being arranged to close at a speed, say 27 miles per hour, somewhat lower than the speed of 30 miles per hour at which the contacts 0—30 open to operate the electro-pneumatic valve. Another indicating device, such as a lamp LSL, is preferably used and is energized while the low speed relay LS is deenergized, and thus indicates to the engineer when the prescribed speed limit is in force. This lamp LSL is lighted as soon as the low speed relay is deenergized by operation of the acknowledging contactor, and remains lighted until the prescribed time interval has elapsed and also the speed has been properly reduced, so that the relay LS is reenergized in a manner above explained.

The primary purpose of maintaining the prescribed speed limit in effect for a predetermined time interval, such as two minutes, is to provide a restriction upon a train which may happen to be travelling at a low or medium speed when passing the caution or danger signal. In such a case, without the time element feature, the low speed relay LS, if deenergized at all, might be restored after a short distance of travel into the block, and the speed restriction removed. To avoid the contingency that a train under such conditions might accelerate to an objectionable speed limit, the time measuring device is provided to prevent restoration of the low speed relay LS, even though the speed may be low enough, until after the lapse of a prescribed time interval, during which it may be assumed that the train has advanced through the block or to a point where little distance is left to the next track inductor for objectionable acceleration. It is contemplated that the prescribed time interval will be selected to conform with the average length of blocks and the operating characteristics of the trains in such a way that the restricted speed limit will be maintained effective under ordinary operating conditions for a time sufficient to afford the protection desired, without materially interfering with the traffic capacity of the railroad.

The stick circuit for the valve EPS controlling the time-measuring device is preferably arranged as shown to include a normally closed contact 2 of the acknowledging contactor ACK. The purpose of this is to give a complete time interval for each operation of the acknowledging contactor to take care of the situation where, for example, the running speed, time interval and the length of the block are such that a second operation of the acknowledging contactor is made as the train passes another restrictive signal before the timing device completes its operation. In such a case, when the second operation of the acknowledging contactor occurs, the stick circuit for the control valve EPS is broken and this valve is deenergized, its pick-up circuit being broken at the contacts 126 of the pressure contactor PC in its partially operated condition. This deenergization of the control valve EPS exhausts the timing reservoir TR to start another time cycle; and when the timing device has been restored to normal, the contacts 126 close to energize the control valve EPS again, relay LS being still down. Consequently, when a train passes two restrictive signals in succession and the engineer operates the acknowledging contactor at each signal location to avoid a penalty stop, the restricted speed limit is maintained in effect for the prescribed time interval for each block.

Figure 7:
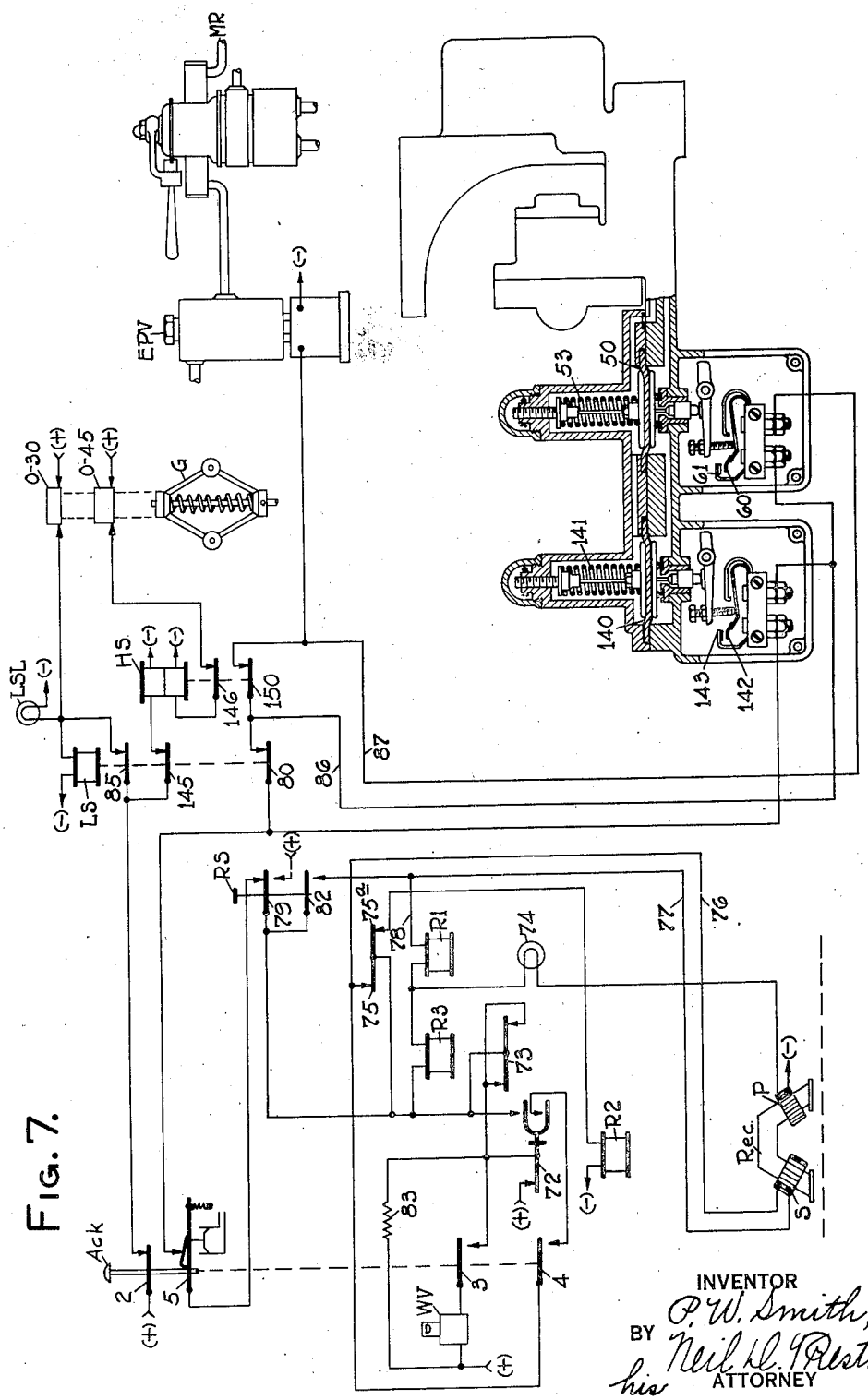
Fig. 7 shows a further modification for making the degree of braking dependent upon the running speed of the train at the time of acknowledgment of a restrictive signal indication.

*Modification of Fig. 7.*—Another modification of the invention is illustrated in Fig. 7, in which the reduction in equalizing reservoir pressure required before the engineer may move his brake valve to the lap position, and hence the degree of braking, is dependent upon the speed of the train at the time the acknowledging contactor is operated to pass a signal giving a restrictive indication.

The purpose of this modification is to avoid a severity of brake application and reduction in speed which are not required for safety under certain conditions and are objectionable in their effect upon the equipment and passengers. In some cases, the speed at which a train may pass an acknowledging point will be the maximum normal running speed of the train permissible under the rules for the portion of track, as for example, at the first caution signal encountered, where no material reduction in the normal running speed of the train has been made on account of the limited preview of the signal, or failure of the engineer to make a speed reduction for any other reason. In other cases, the train may pass the acknowledging signal at a moderate speed, perhaps because the speed had already been reduced from the normal running speed in obedience to a previous approach restricting signal indication in a signal system providing multiple block indications, or perhaps because the engineer may have acted on a preview of the first caution signal and already slowed down the train to a moderate speed before passing the point for the acknowledgment of such signal.

Regardless of the particular conditions or circumstances accounting for such difference in the running speed of the train at the acknowledging point, it can be readily seen that, if the train is running at the maximum normal running speed at the acknowledging point, a full service application and the maximum degree of braking is necessary to slow down the train promptly; whereas, if the train should pass the acknowledging point at a moderate speed, a smaller brake pipe reduction and a less degree of braking is adequate. Accordingly, the modification of Fig. 7 provides for different degrees of braking dependent upon the speed of the train at the point of acknowledgment.

This modification of Fig. 7 adds to the same general organization of parts illustrated in Fig. 1 another reduction responsive device and a high speed relay HS. The additional reduction responsive device is of the same form and type shown in Fig. 1, and comprises a diaphragm 140 and a spring 141 for operating contacts 142—143, the tension of the spring 141 being so adjusted that the contacts 142—143 are closed for a small reduction in equalizing reservoir pressure, say 15 pounds, less than the 25 pound reduction or full service application required to close the other contacts 60—61.

The relay HS has two windings for the purpose of separating circuits, the upper winding being included in a normally closed pick-up circuit including a front contact 145 of the low speed relay LS and receiving its current through the normally closed front contact 2 of the acknowledging contactor ACK in the same way as in the arrangement of Fig. 1. The other lower winding of the relay HS is energized by a stick circuit including a front contact 146 of the said relay and speed contacts designated 0—45, which are operated by the speed responsive device or governor G to open for all speeds above a selected moderat speed, such as 45 miles per hour.

The energizing circuit for the electro-pneumatic valve EPV controlling the brake valve actuator includes a front contact 150 of the high speed relay HS, as well as the contact 80 of the low speed relay LS; and shunt paths around these contacts of these relays are established by closure of the reduction responsive contacts 60—61 and 142—143 respectively.

This modification of Fig. 7 has all the operating characteristics of the organization shown in Fig. 1, and in addition makes the degree of braking required dependent upon the speed of the train at the acknowledging point in the following manner.

If the train is running at a moderate speed, say less than 45 miles per hour, but above the restricted speed limit of 30 miles per hour at the time the acknowledging contactor ACK is operated to avoid the penalty stop while passing a caution signal, the relay LS is deenergized, but the relay HS is maintained energized by its stick circuit through the speed contacts 0—45 assumed to be closed. Consequently, when a limited reduction has been made in equalizing reservoir pressure, such as 15 pounds and the reduction responsive contacts 60—61 close, a shunt is provided for the open front contact 80 of the low speed relay LS, and a circuit is established to reenergize the electro-pneumatic valve, thereby restoring the brake valve actuator and allowing the engineer to lap his brake valve in the manner already explained.

If, on the other hand, the train is running at some high speed greater than 45 miles per hour at the time of acknowledgment, both relays LS and HS are deenergized; and the electro-pneumatic valve EPV is not reenergized until the reduction responsive contacts 60—61 corresponding to a 25-pound or full service brake application, are closed as well as the reduction limiting contacts 142—143 to provide shunt paths around both of the front contacts 80 and 150 of the relays LS and HS. Hence, the engineer cannot move his brake valve to the lap position until a full service brake application has been made.

In both cases, whether the speed be moderate or high at the time of acknowledgment, the brake application cannot be released until the train has been brought to a speed below the restricted speed limit of 30 miles per hour, and the low speed relay LS is energized by its pick-up circuit through the speed contacts 0—30 in turn closing its front contact 145 in the pick-up circuit through the upper winding of the relay HS.

The indicating lamp LSL in multiple with the low speed relay LS tells the engineer when the required reduction in speed has been made and he may release the brakes. The indicator 27 on the brake valve actuator tells the engineer when the required reduction in equalizing reservoir pressure has occurred and he may lap his brake valve.

From the foregoing discussion of certain specific embodiments of the invention, it can be understood without further explanation how an automatic train control system in accordance with this invention serves to enforce certain reductions in speed in connection with enforcing observance and acknowledgment of restrictive signal indications, thereby supplementing the safety in train operation afforded by a permissive automatic stop system in a simple and effective manner.

The specific embodiments of the invention illustrated and described are merely typical or representative; and it should be understood that various adaptations, modifications, and additions may be made to these specific embodiments without departing from the fundamental functions and advantages of the invention.

What I claim is:

1. In an automatic train control system for railroads equipped with a block signal system and having trackway means effective near the entrance to each caution block to communicate a stopping influence to moving vehicles, vehicle carried apparatus comprising, a brake applying device, a speed responsive device operatively connected to the wheels of the vehicle, an acknowledging contactor manually operable by the engineer without applying the brakes, means for operating said brake applying device irrespective of the speed of the vehicle in response to a stopping influence if the engineer fails to have said acknowledging contactor in the operated position at the time of the transmission of said stopping influence, and means including said speed responsive device and automatically rendered effective upon manual operation of said acknowledging contactor and independently of the transmission of said stopping impulse for operating said applying device thereafter if and so long as the running speed of the vehicle exceeds a predetermined restricted speed limit.

2. An automatic train control system of the permissive type described, in which an automatic brake application automatically initiated near the entrance to each caution block to bring a railway vehicle to a stop may be forestalled by prior actuation of an acknowledging device, said system comprising, in combination with said acknowledging device, a normally energized stick relay having its stick circuit broken by operation of said acknowledging device, a speed responsive device operatively connected to the wheels of the vehicle and closing a pick-up circuit for said relay only if the running speed of the vehicle is below a predetermined restricted speed limit, and automatic braking apparatus controlled by said stick relay, whereby actuation of the acknowledging contactor at a caution signal to forestall an automatic brake application to bring the train to a stop at the same time de-energizes said stick relay to render said brake setting apparatus effective until the speed of the vehicle is less than the restricted speed limit.

3. An automatic train control system for railroads comprising, in combination with impulse communicating means acting inductively near each restrictive signal to cause momentary de-energization of a primary control relay on a vehicle, of vehicle equipment comprising, an acknowledging contactor manually operable by the engineer, a brake control stick relay de-energized by the de-energization of said primary control relay unless said acknowledging contactor is in its operated position at the time, a normally energized low speed stick relay having its stick circuit broken by the manual operation of the acknowledging contactor, a speed responsive device operatively connected to the wheels of the vehicle and having speed contacts closed only if the running speed of the vehicle is below a predetermined restricted speed limit, a pick-up circuit for said low speed relay including said speed contacts, means for restoring said brake control relay only after the vehicle is brought to a stop, and normally energized brake setting apparatus effective upon de-energization thereof and having an energizing circuit including in series contacts of said brake control relay and said low speed relay.

4. In an automatic train control system for railroads equipped with block signals and including trackway means effective at the entrance to each caution block to communicate a stopping influence to a passing vehicle regardless of its speed at the time by de-energizing a primary control relay thereon, vehicle equipment comprising, a brake valve actuator operable to move the rotary valve of the regular engineer's brake valve to the service position and at the same time operatively disconnect said rotary valve from the handle of the brake valve with respect to movement toward the release position, a manually operable acknowledging device effective for a limited time only for each manual operation, a manually operable reset device effective only if the vehicle has been brought to a stop, means responsive to the de-energization of said primary control relay for causing operation of said brake valve actuator unless said acknowledging device is in its operated position at the time and for maintaining such operation of said brake valve actuator until said reset device is effective, a speed responsive device operatively connected to the wheels of the vehicle, speed control means including said speed responsive device and rendered effective by the manual actuation of said acknowledging device to cause operation of said brake valve actuator during movement of the vehicle through the caution block if and only so long as the vehicle exceeds a predetermined speed limit, and means effective if and only so long as a predetermined reduction in equalizing reservoir pressure exists for restoring said brake valve actuator to normal independently of its control by said speed control means, whereby after a predetermined reduction in equalizing reservoir pressure has been made by the automatic operation of the brake valve actuator due to excessive speed, the brake valve actuator is restored and the engineer may move his brake valve to the lap position to stop further venting of the brake pipe.

5. An automatic train control system of the permissive automatic stop type described, in which an automatic brake application for a penalty stop occurs at each restrictive signal unless the engineer manually operates an acknowledging device, and in which the vehicle equipment comprises, a brake applying device operable to cause a reduction in brake pipe pressure continuing until said device is restored to normal and the engineer's brake valve handle is manually moved to the lap position, a speed responsive device operatively connected to the wheels of the vehicle, speed control means including said speed responsive device and rendered effective by the operation of said acknowledging device by the engineer to avoid a penalty stop to cause operation of said brake applying device if and so long as the vehicle exceeds a predetermined restricted speed limit in a caution block, reduction responsive means for restoring said brake applying device to normal independently of its control by said speed control means after and only so long as a predetermined reduction in equalizing reservoir pressure exists, and means for visually indicating to the engineer when said brake applying device is in its operated condition and also when said speed control means is in its effective condition.

6. In an automatic train control system of the permissive automatic stop type described for railroads equipped with a block signal system and having trackway means effective to transmit a stopping impulse to a moving vehicle regardless of its speed at each signal giving a restrictive indication, vehicle equipment comprising a brake applying device, an acknowledging device manually operable by the engineer, a speed responsive device operatively connected to the wheels of the vehicle, penalty stop means acting in response to a stopping influence unless the engineer at the time has said acknowledging device in its operated condition to cause said brake applying device to assume its operated condition until the speed responsive device assumes a condition corresponding to substantially zero speed, and speed control means initially rendered effective by the manual operation of said acknowledging device and remaining effective until the speed of the vehicle has been brought below a predetermined speed limit for independently causing operation of said brake applying device if the vehicle exceeds such speed limit.

7. In an automatic train control system of the permissive stop type described for railroads equipped with block signals, vehicle equipment comprising a speed responsive device having speed contacts closed at speeds below a predetermined restricted speed limit, a brake setting device having an energizing circuit, electro-responsive means rendered effective when a train enters a caution block if and so long as said speed contacts are open for opening said energizing circuit and thereby cause an application of the brakes, a time measuring device set into operation at the same time as said electroresponsive means for preventing restoration thereof regardless of the closure of said speed contacts until after the lapse of a predetermined time interval.

8. Car equipment for intermittent inductive train control systems of the permissive stop type described comprising, in combination with a brake setting device automatically controlled from the trackway, of a manually operable acknowledging contactor effective only if operated prior to the operation of said brake setting device for preventing operation thereof in response to the control from the trackway, speed control means rendered effective by the manual actuation of said acknowledging contactor to cause operation of said brake setting appliance if the running speed of the vehicle exceeds a predetermined restricted speed limit, and a time element device set into operation at the same time said speed control means is rendered effective for preventing the restoration of said speed control means until after the lapse of a predetermined time interval.

9. Vehicle equipment for automatic train control systems in which a stopping influence is communicated near each signal of a block signal system giving a restrictive indication, said vehicle equipment comprising a brake applying device, an acknowledging contactor manually operable by the engineer, means for operating said brake applying device in response to the transmission of the stopping influence and irrespective of the running speed of the vehicle at the time if said acknowledging contactor is not in its operated position at the time of the transmission of said stopping influence, speed limiting means rendered effective upon manual actuation of said acknowledging contactor for independently operating said brake applying device if the speed of the vehicle thereafter exceeds a predetermined restricted speed limit, said speed limiting means when once effective remaining in that condition until after the lapse of a predetermined time interval and also until the speed of the vehicle has been brought below said restricted speed limit.

10. In an automatic train control system for railroads equipped with block signals, the combination with means partly on the track and partly on a vehicle for communicating a stopping impulse near the entrance of each caution block, of vehicle carried equipment comprising, an acknowledging device manually operable by the engineer, a brake setting device, means for operating said brake setting device independently of the speed of the vehicle in response to a stopping influence unless said acknowledging device is in its operated position at the time and for maintaining said brake application until the vehicle has been brought to a stop, and speed control means for establishing for a predetermined time interval after the operation of said acknowledging device a restricted speed limit which the vehicle cannot exceed without an automatic operation of said brake setting device.

11. In an automatic train control system for railroads equipped with block signals, trackway means co-operating with vehicle carried means and effective near each restrictive signal location to communicate to the vehicle a stopping influence, vehicle equipment comprising a brake applying device, an acknowledging device manually operable by the engineer, penalty stop means responding to the stopping influence regardless of the speed of the vehicle at the time and effective unless said acknowledging device is at the time in its operated condition to operate said brake applying device and cause a brake application which cannot be released until the vehicle has been brought to a stop, a speed responsive device operatively connected to the wheels of the vehicle, speed control means including said speed responsive device and automatically rendered effective by the manual operation of said acknowledging device and remaining effective until the speed of the vehicle has once been brought below a predetermined restricted speed limit for independently controlling the operation of said brake applying device, and means for indicating to the engineer when said speed control means is effective.

12. In an automatic train control system of the type described in which a stopping influence is communicated to a vehicle at each restrictive signal location, vehicle equipment comprising, a brake valve actuator associated with the regular engineer's brake valve of the air brake system and operable to move the rotary valve to the service position and at the same time disconnect it operatively from the handle of the brake valve with respect to movement toward the release position, an acknowledging device manually operable by the engineer, means responsive to the stopping influence and effective regardless of the speed of the vehicle at the time unless said acknowledging contactor is in its operated position at the time for operating said brake valve actuator and maintaining it in that condition until the vehicle has been brought to a stop, speed control means automatically rendered effective by the manual operation of said acknowledging contactor to forestall such a penalty stop for independently causing operation of said brake valve actuator if and only so long as the running speed of the vehicle thereafter exceeds a predetermined restricted speed limit, and fluid pressure actuated means effective only if a predetermined reduction in equalizing reservoir pressure exists for governing the operation of said brake valve actuator independently of said speed control means to cause restoration of said brake valve actuator and permit the engineer to lap the brake valve after a predetermined reduction in equalizing reservoir pressure has been made, but not release the brakes while the vehicle is exceeding the restricted speed limit.

13. Automatic train control equipment for railway vehicles comprising, a manually operable acknowledging contactor, a stick relay having its stick circuit broken by operation of said acknowledging contactor from its normal position, a speed responsive device operatively connected to the wheels of the vehicle, and closing a pick-up circuit for said stick relay only at speeds below a prescribed restricted speed limit, a brake valve actuator associated with the regular engineer's brake valve and operable to cause a reduction in equalizing reservoir pressure continuing until said brake valve actuator is restored to normal and the engineer's brake valve is manually operated to the lap position, an electro-pneumatic valve controlling the operation of said actuator and having an energizing circuit including a front contact of said stick relay, and fluid pressure actuated contacts closed only if and while a predetermined reduction in equalizing reservoir pressure exists for energizing said electro-pneumatic valve independently of said stick relay, whereby said brake valve actuator is restored to normal independently of the speed of the vehicle and said stick relay to permit the engineer to move his brake valve to the lap position when a predetermined reduction in equalizing reservoir pressure has been made.

14. Vehicle equipment for automatic train control systems for railroads equipped with a block signal system and responsive to stopping influences communicated near signals giving restrictive indications, said vehicle equipment comprising a brake valve actuator associated with the regular engineer's brake valve and operable to move the rotary valve thereof to the service position and at the same time disconnect it from the handle of the brake valve with respect to movement toward the release position, a normally energized electro-pneumatic valve controlling the operation of said brake valve actuator, a manually operable acknowledging contactor, a reset device effective only if the vehicle is brought to a stop, means including said acknowledging contactor and said reset device and responding to the transmission of a stopping influence regardless of the speed of the vehicle at the time to de-energize said electro-pneumatic valve unless said acknowledging contactor is in an operated position at the time, and to maintain such de-energization until said reset device is effective, a low speed stick relay having a stick circuit broken by operation of said acknowledging contactor and having a front contact included in the energizing circuit for said electro-pneumatic valve, a speed responsive device operatively connected to the wheels of the vehicle for closing a pick-up circuit for said low speed relay only if the vehicle is traveling at a speed below a predetermined restricted speed limit, and fluid pressure operated contacts associated with the equalizing reservoir of the air brake system and effective only after a predetermined degree of braking is in effect for establishing a shunt around the said front contact of said low speed relay.

15. In a train control system for railroads equipped with a block signal system, the combination with trackway means effective near the entrance to each block to communicate to a vehicle a stopping influence if the corresponding signal indicates caution, vehicle carried apparatus comprising a brake valve actuator co-operating with the usual engineer's brake valve and operable to move the rotary valve thereof to the service position and at the same time operatively disconnect it from the handle of the brake valve with respect to movement toward the release position, a manually operable reset device effective only if the vehicle is at rest, control means operable in response to the communication of a stopping influence from the track way at a caution signal to cause operation of said brake valve actuator, said control means when once operated remaining in that condition until said reset device is operated, a manually operable acknowledging contactor and associated electrical circuits effective only if actuated prior to the communication of the stopping influence to prevent such operation of said control means for a limited time only, speed control means automatically rendered effective upon manual actuation of said acknowledging contactor and normally tending to cause operation of said brake valve actuator so long as the vehicle is travelling at a speed above a predetermined restricted speed limit, and means effective only if a predetermined reduction in equalizing reservoir pressure is in effect to control the operation of said brake valve actuator to its normal condition independently of said speed control means and thereby permit the engineer to operate his brake valve to the lap position.

16. An automatic train control system of the type described in which the brakes are automatically applied when a train enters a caution block unless or until the speed of the train is below a predetermined restricted speed limit, and in which the vehicle equipment comprises a speed responsive device opening certain contacts at speeds above said restricted speed limit and other contacts at speeds above a higher moderate speed limit, fluid pressure operated contacts responsive to the amount of reduction in equalizing reservoir pressure, and means including said contacts for causing a brake application corresponding to a predetermined reduction in equalizing reservoir pressure if the speed of the train upon entering the caution block is above said restricted speed limit and a greater reduction if the speed is also above said moderate speed limit, whereby the amount of reduction in equalizing reservoir pressure and the degree of braking is dependent upon the speed of the train at the time it enters the caution block.

17. In an automatic train control system of the type described, vehicle equipment comprising a speed responsive device for closing contacts at speeds below a restricted speed limit and other contacts for speeds below a higher moderate speed limit, a normally energized brake control device having an energizing circuit, means for opening said energizing circuit when the vehicle enters a caution block at one point in the circuit if at the time the speed of the vehicle exceeds said restricted speed limit and also at another point if the speed of the vehicle exceeds said moderate speed limit, said means maintaining such opening or openings of said energizing circuit until the speed of the vehicle has been brought below said restricted speed limit, and fluid pressure actuated contacts operable to establish a shunt around said first point of opening in said energizing circuit in response to a predetermined degree of reduction in equalizing reservoir pressure and to establish a shunt around the other point of opening in response to a higher degree of reduction in equalizing reservoir pressure.

18. Vehicle equipment for automatic train control systems of the type described comprising, a speed responsive device operatively connected to the wheels of the vehicle, a brake setting device, a time-measuring device, an acknowledging contactor manually operable by the engineer, a low speed stick relay, and means including interconnecting circuits for opening a stick circuit of said stick relay in response to the manual operation of said acknowledging device and thereby actuate said brake applying device if the speed of the vehicle as manifested by said speed responsive device exceeds a restricted speed limit while said relay is de-energized, said stick relay being restored to its energized condition only if a predetermined time interval measured by the operation of said time measuring device has elapsed and also the speed of the vehicle is below said speed limit, said time measuring device being automatically set into operation for each manual operation of said acknowledging device, whereby a restricted speed limit is enforced for a predetermined time interval after each manual operation of the acknowledging device.

19. In an automatic train control system, the combination with means partly on the track and partly on the train for manifesting entrance of the train into a non-clear zone, wayside signals at the entrance to each zone for manifesting whether such zone is clear or non-clear, a manually operable acknowledging device on the train, means effective to cause an automatic application of the brakes of the train if the engineer does not operate said acknowledging device upon entrance of the train into a non-clear zone, and other means for imposing a speed restriction upon the train if the engineer operates said acknowledging device, which speed restriction if violated results in an automatic brake application.

20. In a train control system, the combination with means partly on the vehicle and partly on the track for manifesting on the train momentarily upon entering a traffic zone whether clear or non-clear traffic conditions exist in such zone, a speed responsive device on the train for manifesting the speed of the train, a manually operable acknowledging device on the train, brake control apparatus on the train, means for effecting an automatic brake application irrespective of the speed of the train if the engineer does not operate said acknowledging device when entering a non-clear zone, means rendered effective by operation of said acknowledging device for imposing a speed limit by said speed responsive device which speed limit if exceeded will result in an automatic brake application, said speed limit being maintained only so long as the running speed of the vehicle exceeds said speed limit, and means effective only after the vehicle has been brought to a stop for releasing the automatic brake application caused by the failure of the engineer to operate said acknowledging device upon entering the non-clear zone.

21. In an automatic train control system, the combination with means partly on the track and partly on the train for manifesting on the train traffic conditions in advance, a manually operable acknowledging device on the train, brake control means on the train, means effective to actuate said brake control means if said train enters an adverse traffic zone and the engineer does not operate said acknowledging device, speed restricting means on the train rendered active upon operation of said acknowledging device, and means for rendering said speed restricting means inactive a predetermined time after it was rendered active providing the speed of the train is then below a predetermined value.

22. In an automatic train control system, the combination with means partly on the track and partly on the train for manifesting on the train traffic conditions in advance, a manually operable acknowledging device on the train, brake control means on the train, means effective to actuate said brake control means if said train enters an adverse traffic zone and the engineer does not operate said acknowledging device, speed restricting means on the train, and means for rendering said speed restricting means inactive a predetermined time after it was rendered active providing the speed of the train is then below a predetermined value.

23. Means for determining when a predetermined reduction in brake pipe pressure has been made comprising, a volume reservoir, an engineer's brake valve, means for connecting said volume reservoir to atmosphere when said engineer's brake valve is in a normal non-braking position and for connecting said reservoir to said brake pipe when said engineer's brake valve is in a brake applying position through the medium of a passage including a check valve, and differential piston means connected between said volume reservoir and a chamber reflecting the pressure existent in said brake pipe.

24. In an automatic train control system, the combination with means partly on the track and partly on the train for manifesting entrance of the train into a non-clear zone, wayside signals at the entrance to each zone for manifesting whether such zone is clear or non-clear, a manually operable acknowledging device on the train, normally energized train control means affected by traffic conditions and also by operation of the acknowledging device, reset means for the train control means, and circuit means operable if the engineer operates said acknowledging device upon entrance of a train into a clear zone and at a speed above a predetermined value, to deenergize the train control means so as to require the speed of the train to be reduced to a predetermined value to reenergize the train control means, and circuit means operable if the engineer fails to operate said acknowledging device upon entering a non-clear zone to deenergize the train control means so as to require the operation of the reset means to reenergize the train control means.

PERCY W. SMITH.